(12) United States Patent
Mohri et al.

(10) Patent No.: US 6,657,944 B2
(45) Date of Patent: Dec. 2, 2003

(54) OBJECTIVE LENS DRIVING DEVICE

(75) Inventors: Masanari Mohri, Hyogo (JP); Hiroshi Yamamoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 09/790,830

(22) Filed: Feb. 22, 2001

(65) Prior Publication Data

US 2001/0019534 A1 Sep. 6, 2001

(30) Foreign Application Priority Data

Mar. 1, 2000 (JP) ........................... 2000-055273

(51) Int. Cl.[7] ............................. G11B 7/09; G11B 21/16
(52) U.S. Cl. .................. 369/247; 369/244; 369/44.16
(58) Field of Search ........................ 369/247, 244, 369/44.16; 359/719, 811, 819

(56) References Cited

U.S. PATENT DOCUMENTS

2002/0109925 A1 * 8/2002 Miura ........................ 359/719

FOREIGN PATENT DOCUMENTS

| JP | 60179948 A | * | 9/1985 | ............ G11B/7/12 |
| JP | 02105338 A | * | 4/1990 | ............ G11B/7/09 |
| JP | 03268234 A | * | 11/1991 | ............ G11B/7/09 |
| JP | 05197982 A | * | 8/1993 | ............ G11B/7/09 |
| JP | 05334708 A | * | 12/1993 | ............ G11B/7/12 |
| JP | 06302001 A | * | 10/1994 | ............ G11B/7/12 |
| JP | 08287477 A | * | 11/1996 | ............ G11B/7/085 |
| JP | 10221583 A | * | 8/1998 | ............ G02B/7/02 |
| JP | 11016196 A | * | 1/1999 | ............ G11B/7/135 |
| JP | 11-312322 | | 11/1999 | |

* cited by examiner

Primary Examiner—William Klimowicz
(74) Attorney, Agent, or Firm—Merchant & Gould, P.C.

(57) ABSTRACT

In an objective lens driving device having a movable portion including an objective lens held by a lens holder, a damage prevention system for preventing the objective lens or a disk from being damaged when the objective lens or the lens holder collides with the disk is provided. The damage prevention system is constituted by inserting a protecting member formed of an elastic member in a fitting portion on an upper surface of the lens holder while being deformed. In this manner, it is possible to generate a sufficient holding power with respect to the protecting member without using glue or the like.

6 Claims, 6 Drawing Sheets

OBJECTIVE LENS DRIVING DEVICE

BACKGROUND OF THE INVENTION

1. Field of the Invention

The present invention relates to an objective lens driving device in an optical information recording or reproducing apparatus for a disk-shaped recording medium.

2. Description of Related Art

An objective lens driving device controls and drives an objective lens in two axis directions, namely, the direction perpendicular to a disk-shaped recording medium (referred to as a focusing direction in the following) and the radial direction of the disk-shaped recording medium (referred to as a tracking direction in the following), thereby suppressing a defocusing of the objective lens with respect to an information recording plane of the disk-shaped recording medium (referred to as a disk in the following) and a deviation of an optical axis of the objective lens from a disk track.

In recent years, along with the densification of disk information and the acceleration of disk rotation, it has become necessary to improve the accuracy of the above-described control performance to a higher level. This increases a demand for a wider frequency band and reduced undesired resonance in dynamic characteristics of the objective lens driving device.

On the other hand, it also has become necessary to reduce the size, in particular, the thickness of driving devices. In an optical head including the objective lens driving device, efforts are made to achieve a thinner device by shortening a working distance (referred to as WD in the following) of the objective lens and by reducing a mechanical space between the disk and a lens holder.

However, since the vibration amount of the disk surface is a standard value (for example, the standard for CDs is ±0.5 mm), when the objective lens WD is shortened excessively, the objective lens or the lens holder and the disk collide. Accordingly, measures need to be taken with respect to a damage of the disk and the objective lens caused by the collision.

In response to such demands, a protector system against the collision has been suggested in a conventional objective lens driving device, as disclosed in JP 11(1999)-312322 A.

The following is a description of the conventional objective lens driving device (disclosed in JP 11-312322 A), with reference to the accompanying drawing. FIG. 6 is an exploded perspective view showing a configuration of the conventional objective lens driving device.

In FIG. 6, numeral 101 denotes an objective lens, numeral 102 denotes a lens holder, numeral 103 denotes a focusing coil, numerals 104a and 104b denote tracking coils, and numerals 105a and 105b denote coil substrates (the coil substrate 105b is not shown in this figure). The objective lens 101 and the coil substrates 105a and 105b are fixed firmly to the lens holder 102 in their desired position. Furthermore, the focusing coil 103 and the tracking coils 104a and 104b are wound directly around the lens holder 102, and lead terminals of these coils are fixed by soldering to lands of circuit patterns that are formed on the coil substrates 105a and 105b. In the following, a portion constituted by the lens holder 102 and the components described above is referred to as a movable portion.

Numeral 107 denotes a holder substrate, and numeral 109 denotes a suspension holder. As on the coil substrates 105a and 105b, circuit patterns and lands are formed on the holder substrate 107. The suspension holder 109 and the holder substrate 107 are fixed to a back yoke 112b, which will be described below, by a fixing screw 115. Numerals 106a, 106b, 106c and 106d denote metal wire springs (the metal wire spring 106d is not shown in this figure), whose one ends are fixed to the lands on the coil substrates 105a and 105b in the movable portion and the other ends are fixed to the lands on the holder substrate 107 by soldering respectively. They support the movable portion elastically so as to be movable in the focusing direction F and the tracking direction T. A driving current applied to a terminal (not shown in the figure) on the holder substrate 107 is supplied to the focusing coil 103 and the tracking coils 104a and 104b via the metal wire springs 106a to 106d.

Numeral 112 denotes an actuator base, in which a base portion 112a having a surface parallel to a disk 116 and plate-like back yokes 112b and 112c that are provided in this base portion 112a so as to protrude toward the disk 116 side and to be perpendicular to the disk 116 are formed as one piece. Magnets 113a and 113b are fixed firmly to the back yokes 112b and 112c respectively, with their north poles facing each other. In a magnetic gap of a magnetic circuit formed by the magnets 113a and 113b and the back yokes 112b and 112c, a part of the focusing coil 103 and a part of the tracking coils 104a and 104b are arranged. An electromagnetic force that is generated by a magnetic field in this magnetic gap and the driving current passed through these coils drives the movable portion in the focusing direction F and the tracking direction T. Numeral 114 denotes a shielding yoke for shielding an external magnetic influence.

Numeral 110 denotes a protector, which surrounds the objective lens 101 and is fixed firmly to an upper part of the lens holder 102 by glue 111 so as to protrude furthest from the movable portion toward the disk 116.

The following is a description of an operation of the protector 110. When the movable portion approaches the disk 116 too closely because of a malfunction in the focusing direction F or the like, the protector 110 protruding furthest from the movable portion toward the disk 116 alone collides with the disk 116, thereby preventing the disk 116 and the objective lens 101 from colliding. Also, the protector 110 is formed of a material such as silicone rubber or POM resin, so that the disk 116 is not damaged when colliding.

However, in the conventional objective lens driving device with the above configuration, the protector 110 formed of silicone rubber is fixed firmly to the lens holder 102 by the glue 111. In order to prevent the disk from being damaged, it is indeed appropriate to form the protector 110 with silicone rubber, POM resin or the like, but the silicone rubber and POM resin have an extremely small bonding strength with the glue.

Therefore, there is a problem that the repeated collision causes the protector 110 to come off from the lens holder 102.

Also, the glue has to be applied so as not to be adhered to the colliding surface while fixing the protector 110 firmly. This poses a problem of lowering the working efficiency.

SUMMARY OF THE INVENTION

In view of the above-described problems of the conventional objective lens driving device, it is an object of the present invention to provide an objective lens driving device in which a protecting member that is formed of an elastic member such as silicone rubber can be installed without using glue and a damage prevention system that achieves a sufficient holding power even after repeated collisions is provided.

In order to achieve the object mentioned above, the objective lens driving device of the present invention has the following configuration.

A damage prevention system that is provided in the objective lens driving device of the present invention includes a protecting member formed of an elastic member and a fitting portion that is provided in the lens holder and in which the protecting member is inserted while being deformed. Only deforming the protecting member elastically and inserting it in the fitting portion complete the installation of the damage prevention system. Accordingly, it is possible not only to obtain a stable damage-prevention function even without using glue or the like, but also to achieve a protector system that can reduce manufacturing steps considerably.

Also, it is preferable that the protecting member is substantially spherical. This eliminates the need for a consideration of an elastic-deformation direction and an insertion direction when inserting the protecting member in the fitting portion. Thus, it is possible to simplify the assembly. In addition, a stable damage-prevention function always can be obtained regardless of its insertion direction.

Also, it is preferable that the protecting member is formed of an elastic resin.

For example, the protecting member may be formed of a silicone resin. The silicone resin includes rubber-like material such as silicone rubber and resin-like material such as silicone resin in a narrow sense.

Alternatively, the protecting member may be formed of a POM (polyoxymethylene) resin.

In the damage prevention system of the present invention, even when the material of the protecting member is replaced with POM resin or the like, the shape and size of the fitting portion can be set so that the protecting member deforms in an optimal amount according to the material's elastic modulus. Thus, the material of the protecting member can be selected from a wider range of materials, and a similar effect and result can be obtained with respect to the protecting member made of an arbitrary material.

Also, it is preferable that the fitting portion has a slot shape, with a width smaller than a diameter of the substantially spherical protecting member and a depth greater than a radius of the protecting member. By making the width of the fitting portion smaller than the diameter of the protecting member, the protecting member can be deformed elastically and held. Also, by making the depth of the fitting portion greater than the radius of the protecting member, the contact areas of the protecting member and the internal wall surfaces of the fitting portion can be secured sufficiently. With the above configuration, it is possible to prevent the protecting member from dropping off from the fitting portion.

In addition, it is preferable that a slot serving as the fitting portion has a longitudinal length greater than a length of the protecting member in a direction perpendicular to a compression direction (a diameter), when the length of the protecting member is increased by compressing and deforming the protecting member to have a same width as the fitting portion. With this configuration, the protecting member does not contact the internal wall surfaces of the fitting portion on both ends in the longitudinal direction at the same time when the protecting member is inserted in the fitting portion. Thus, when the protecting member and the disk collide, it is possible to prevent the protecting member from dropping off from the fitting portion because of its impact.

Furthermore, it is preferable that the longitudinal direction of a slot serving as the fitting portion is substantially perpendicular to a rotation direction of the disk. With this configuration, it is possible to obtain a sufficient holding power for opposing an extracting force exerted on the protecting member that is caused by a frictional force or the like between the protecting member and the disk when the protecting member and the disk collide. Also, it is possible to secure a positioning accuracy of the protecting member with respect to the fitting portion.

DESCRIPTION OF THE PREFERRED EMBODIMENTS

The following is a description of an embodiment of the present invention, with reference to the accompanying drawings.

Figure 1:
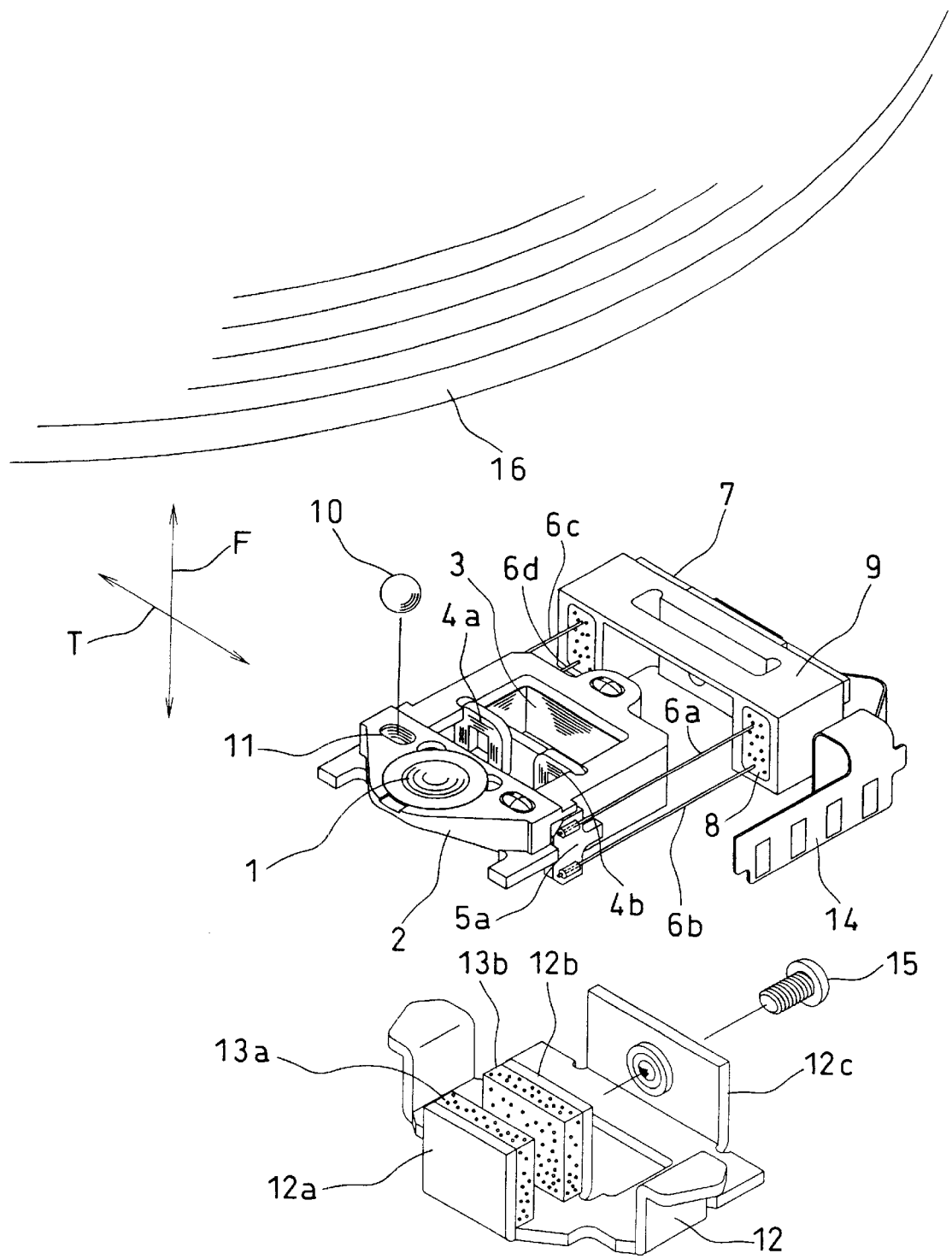
FIG. 1 is an exploded perspective view showing an entire configuration of an objective lens driving device in an embodiment of the present invention.

FIG. 1 is an exploded perspective view showing an entire configuration of an objective lens driving device in the embodiment of the present invention.

In FIG. 1, numeral 1 denotes an objective lens, numeral 2 denotes a lens holder, numeral 3 denotes a focusing coil, numerals 4a and 4b denote tracking coils, and numerals 5a and 5b denote coil substrates (the coil substrate 5b is not shown in this figure). The objective lens 1, the coil substrates 5a and 5b, the focusing coil 3 and the tracking coils 4a and 4b are fixed firmly to the lens holder 2 in their desired position. Also, lead terminals of these coils are fixed by soldering to lands of circuit patterns that are formed on the coil substrates 5a and 5b. Numeral 10 denotes a protector (a protecting member), and numeral 11 denotes a fitting portion for the protector provided on an upper surface of the lens holder. The protector 10 is a spherical member formed of silicone rubber, and inserted and held in the fitting portion for the protector 11. How it is inserted and held will be described in detail below. A portion constituted by the lens holder 2 and the components described above is referred to as a movable portion in the following.

Numeral 7 denotes a holder substrate, numeral 9 denotes a suspension holder, numeral 14 denotes a flexible substrate for an actuator, and numeral 15 denotes a fixing screw. As on the coil substrates 5, circuit patterns and lands are formed on the holder substrate 7, and a land of the flexible substrate 14 is fixed to the desired land of the holder substrate 7 by soldering. The holder substrate 7 to which the flexible substrate 14 is attached and the suspension holder 9 are fixed to a fixing portion 12c, which will be described below, by the fixing screw 15.

Numerals 6a, 6b, 6c and 6d denote metal wire springs, whose first ends are fixed to the lands on the coil substrates 5a and 5b of the movable portion and the other ends are fixed to the lands on the holder substrate 7 by soldering respectively. They support the movable portion elastically so as to be movable in the focusing direction F and the tracking direction T. A driving current applied to a terminal (not shown in the figure) on the holder substrate 7 is supplied to the focusing coil 3 and the tracking coils 4a and 4b via the metal wire springs 6a to 6d. Numeral 8 denotes silicone gel, which is filled in a container provided in the suspension holder 9 for restricting the movement of the metal wire springs 6a to 6d by its viscous resistance, thereby suppressing vibration characteristics such as resonance of the movable portion that is supported elastically by the metal wire springs.

Numeral 12 denotes an actuator base, in which plate-like back yokes 12a and 12b having surfaces perpendicular to a disk 16 and parallel to each other and the fixing portion 12c are formed by bending or the like. Magnets 13a and 13b are fixed firmly to the back yokes 12a and 12b respectively so as to form a magnetic circuit, with their opposite poles facing each other. In a magnetic gap of this magnetic circuit, a part of the focusing coil 3 and a part of the tracking coils 4a and 4b are arranged so as to have a desired space therebetween. An electromagnetic force that is generated by a magnetic field in this magnetic gap and the driving current passed through these coils drives the movable portion in the focusing direction F and the tracking direction T.

Figure 2:
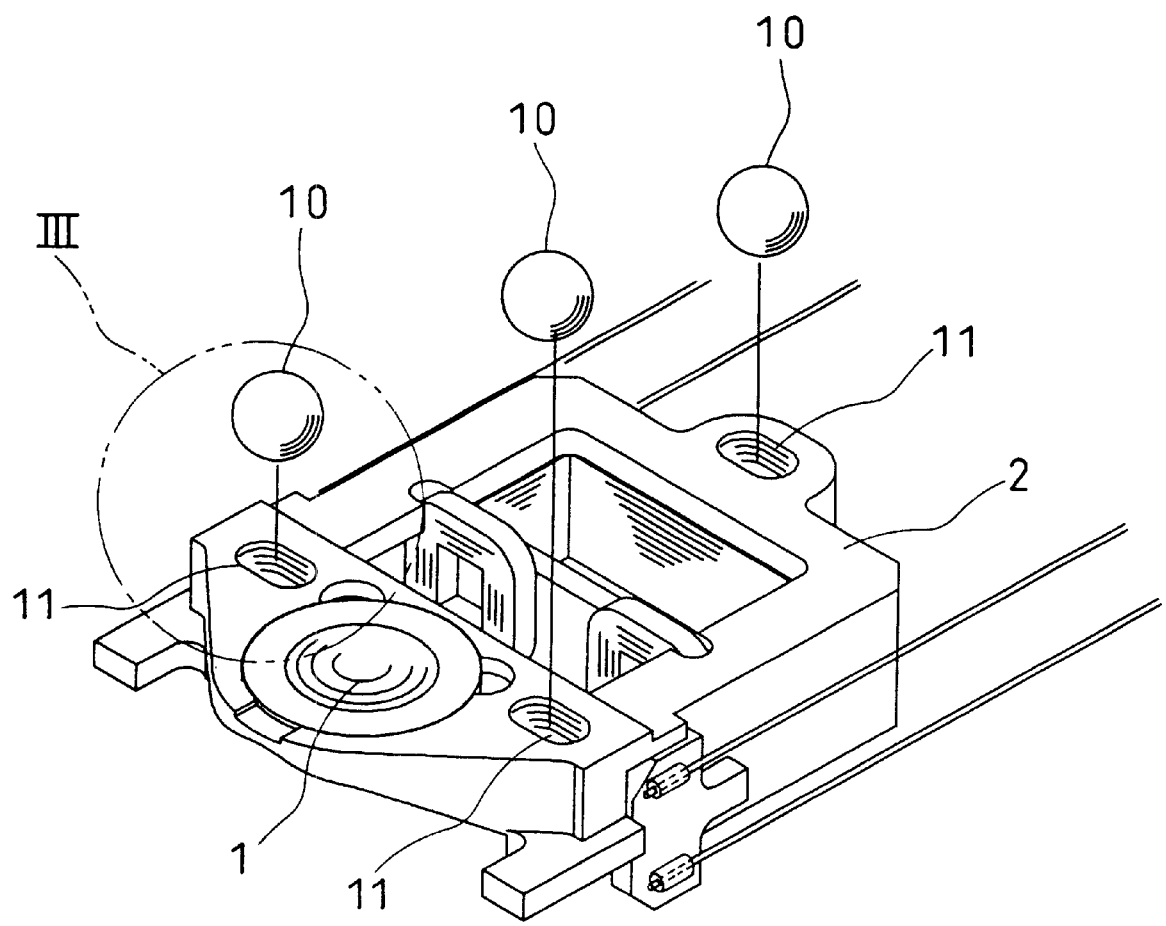
FIG. 2 is a perspective view showing a movable portion of the objective lens driving device of FIG. 1.
Figure 3:
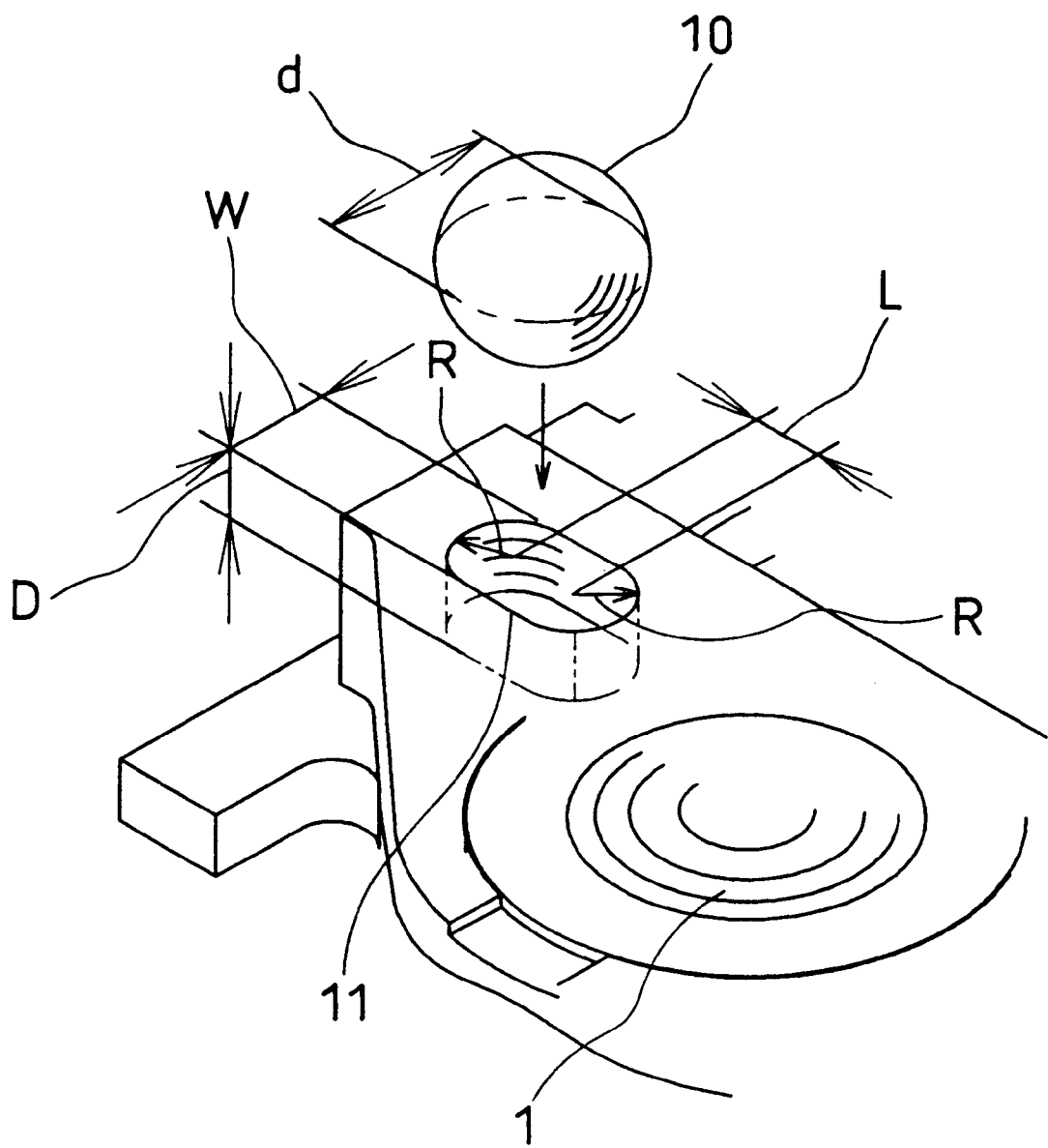
FIG. 3 is an enlarged perspective view of a part III in FIG. 2.
Figure 4:
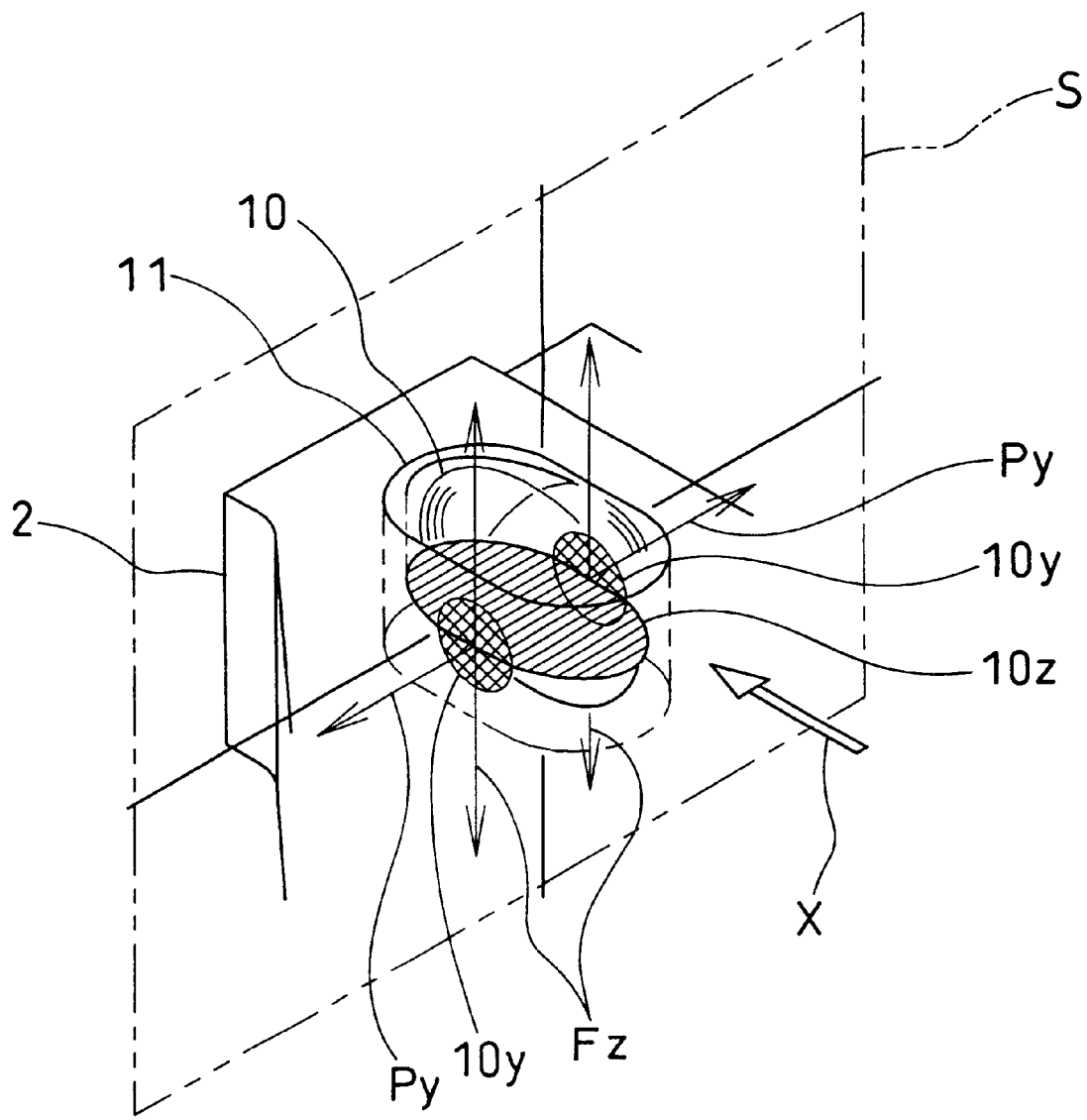
FIG. 4 shows a perspective projection illustrating how a protector is deformed in a fitting portion for the protector and forces are exerted on the protector.
Figure 5:
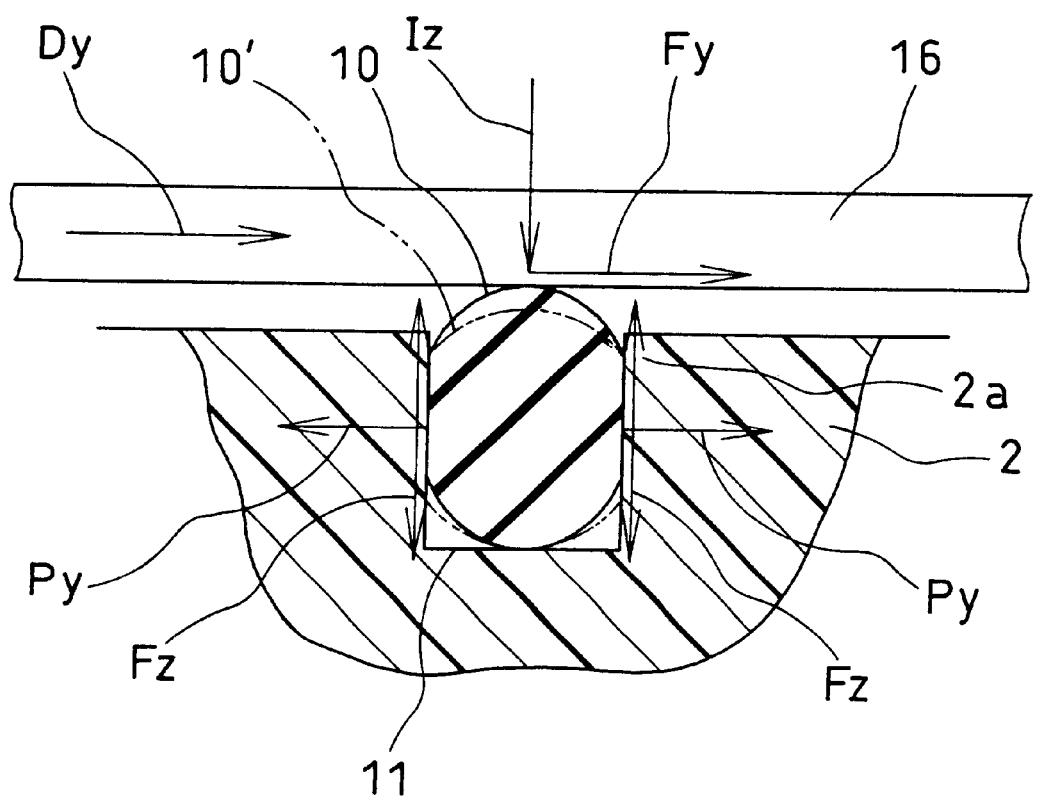
FIG. 5 is a partial sectional view in a virtual plane S in FIG. 4.
Figure 6:
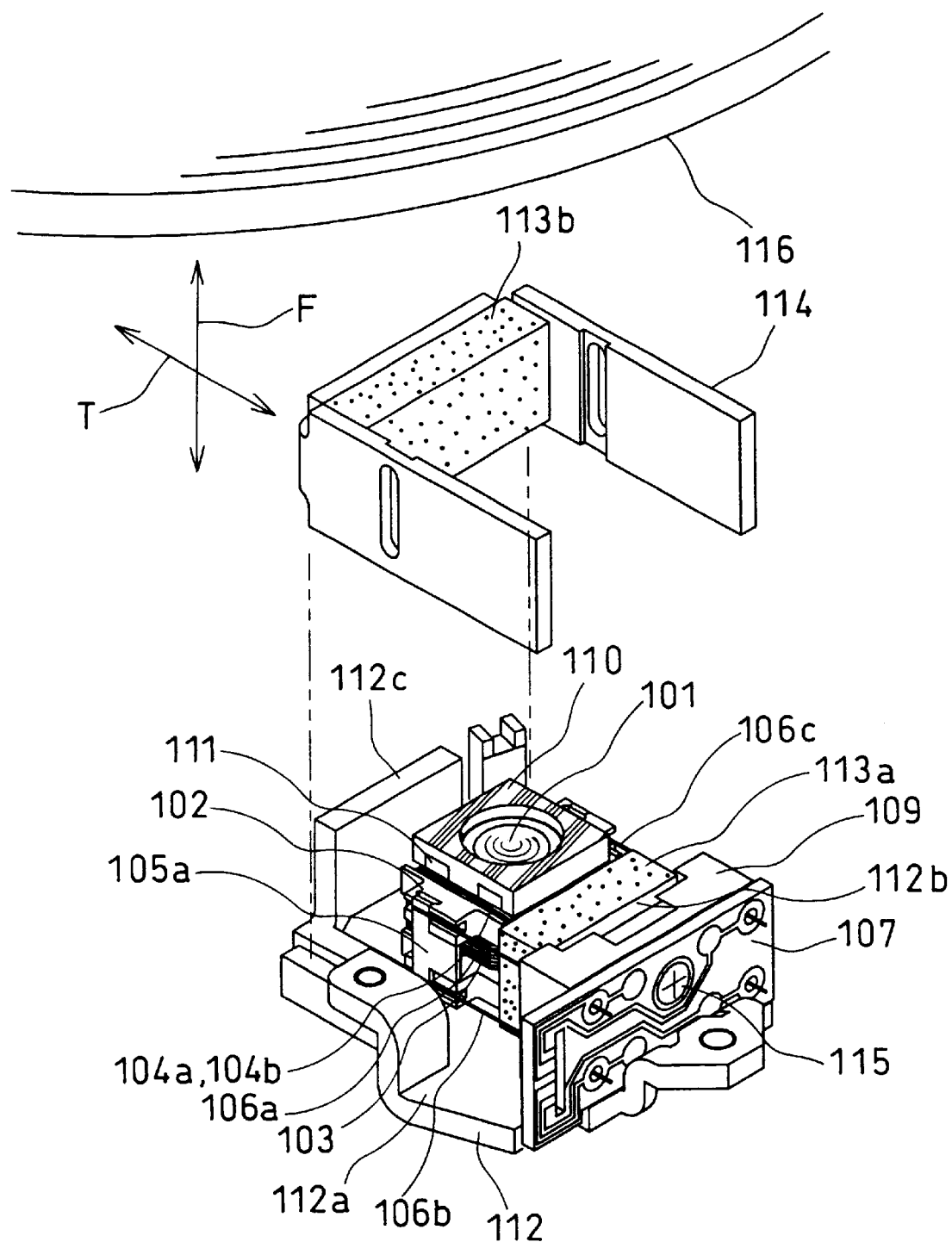
FIG. 6 is an exploded perspective view showing a configuration of a conventional objective lens driving device.

Next, the following is a description of how the protector 10 is inserted and held, with reference to FIGS. 2 to 5. FIG. 2 is a perspective view showing the movable portion in FIG. 1, FIG. 3 is an enlarged perspective view of a part III illustrating the protector 10 and the fitting portion for the protector 11 in FIG. 2, FIG. 4 shows a perspective projection illustrating how the protector 10 is deformed in the fitting portion for the protector 11 and forces are exerted on the protector 10, and FIG. 5 is a partial sectional view in a virtual plane S in FIG. 4 seen in an arrow X direction.

As shown in FIG. 2, three fitting portions for the protector 11 are provided on the upper surface of the lens holder 2. However, the present invention is not limited to the configuration of FIG. 2, as long as the position and the number of the fitting portions for the protector 11 are determined so that, instead of the lens holder 2 or the objective lens 1, the protector 10 contacts the disk 16 when the movable portion or the surface of the disk 16 vibrates. It usually is preferable that the fitting portions for the protector 11 are arranged so that the center of gravity of the movable portion lies inside a polygon formed by connecting the positions of a plurality of the fitting portions for the protector 11 sequentially (a triangle in the case of FIG. 2) in a projection drawing in a normal direction of the disk 16.

Referring to FIG. 3, dimensions of the protector 10 and the fitting portion for the protector 11 are defined as follows. The protector 10 is a spherical member formed of silicone rubber as described above, and the diameter thereof is expressed by d. The fitting portion for the protector 11 has a slot shape including a pair of half-cylindrical surfaces that are placed spaced away on both ends in a longitudinal direction and a pair of parallel flat surfaces joining both of the half-cylindrical surfaces. The radius of the half-cylindrical surfaces is expressed by R, and the distance between the central axes of these two half-cylindrical surfaces with a radius R is expressed by L. In addition, the width of the slot (the gap between the pair of the parallel flat surfaces) is expressed by W (W≈2R), and the depth thereof is expressed by D.

It is preferable that each dimension defined above satisfies the following relationships with respect to the diameter d of the protector 10.

$$d < L < 1.5d \quad (1)$$

$$0.5d < W < d \quad (2)$$

$$D > 0.5d \quad (3)$$

First, how the protector 10 is held when the movable portion is operated in a usual manner and does not collide with the disk 16 will be described with reference to FIG. 4. In FIG. 4, 10y indicates contact surfaces of the protector 10 and the parallel internal wall surfaces facing each other of the fitting portion 11. 10z is a cross-section of the protector 10 taken along a plane that passes the center of the protector 10 and is parallel to the disk 16. S indicates a virtual plane that passes the center of the protector 10 and is perpendicular to the radial direction of the disk 16. X indicates a viewing direction, Py indicates pressures in the contact surfaces 10y, and Fz indicates frictional forces in the contact surfaces 10y in the normal direction of the disk 16.

As described above, the protector 10 and the fitting portion for the protector 11 are designed to satisfy the above formulae (1) to (3). Thus, the protector 10 is inserted in the fitting portion for the protector 11 in such a manner as to be subjected to a compressive force that is proportional to a deformation amount according to the width W satisfying the formula (2). Then, the frictional forces Fz that are proportional to the contact pressures Py caused by the insertion are generated between the protector 10 and the internal wall surfaces of the fitting portion for the protector 11. These frictional forces Fz hold the protector 10 in the fitting portion for the protector 11.

In this manner, by setting the frictional forces Fz suitably within the range satisfying the above formulae (1) to (3), it is possible to obtain the frictional forces that can prevent the protector 10 from coming off from the fitting portion 11 because of an inertial force or the like generated by an acting acceleration of the movable portion.

Next, how the protector 10 is held when it collides with the disk 16 will be described. In FIG. 5, Dy indicates a rotation direction of the disk 16. Fy indicates a frictional force in the rotation direction Dy of the disk 16 to which the protector 10 is subjected from the disk 16. Iz indicates an impact force in the focusing direction to which the protector 10 is subjected from the disk 16. Py indicates pressures in the contact surfaces 10y. Fz indicates frictional forces in the contact surfaces 10y in the normal direction of the disk 16. 2a is an edge portion of the fitting portion for the protector 11. Since the direction of L that was defined in the fitting portion for the protector 11 in FIG. 3 (the longitudinal direction of the fitting portion for the protector 11) is perpendicular to the rotation direction Dy of the disk, the direction of the frictional force Fy also is perpendicular to L.

As shown in FIG. 5, when the disk 16 collides with the protector 10, the protector 10 is subjected to the impact force Iz, so that the frictional force Fy in the rotation direction Dy acts on the upper surface of the protector 10. The frictional force Fy is proportional to the impact force Iz and a coefficient of friction between the disk 16 and the protector 10. This frictional force Fy acts on the protector 10 as a rotation force around the edge portion 2a, that is, an extracting force.

On the other hand, since the lower end of the protector 10 is in contact with the bottom face of the fitting portion for the protector 11, the displacement of the protector 10 in the normal direction of the disk 16 is restricted. Therefore, the impact force Iz not only causes the extracting force described above, but also deforms the protector 10 as indicated by a double-dashed line 10' in FIG. 5. The deformation of the protector 10 that is proportional to the impact force Iz increases the area of the contact surfaces 10y (see FIG. 4) and the contact pressures Py in FIG. 5, so that the above-described frictional forces Fz increase.

Accordingly, the frictional forces Fz that serve as a holding power of the fitting portion for the protector 11 with respect to the protector 10 increase in proportion to the impact force Iz caused by the collision with the disk 16. This prevents the protector 10 from coming off from the fitting portion 11 because of the extracting force generated at the time of colliding. As described above, the magnitude of the extracting force changes in accordance with the change in the magnitude of impact force Iz, but the frictional force Fz always exceeds this extracting force by a certain amount. Therefore, even when collisions with various magnitudes occur repeatedly, the protector 10 does not drop off from the fitting portion for the protector 11.

As becomes clear from the above description, it especially is preferable that the depth D of the fitting portion for the protector 11 is designed not only to satisfy the relationship (3) mentioned above, but in such a manner that the upper end of the protector 10 protrudes beyond the upper surface of the lens holder 2 by a predetermined height when the protector 10 is inserted in the fitting portion for the protector 11 to make contact with the bottom face. When the depth D is too large, the impact force Iz cannot deform the protector 10 to have the shape indicated by the double-dashed line 10', so that the frictional force Fz corresponding to the magnitude of the impact force Iz is not generated. Consequently, the protector 10 drops off or is displaced downward.

It also is preferable that the length of the fitting portion for the protector 11 in the longitudinal direction (L+2R in the above example) is larger than the dimension of the protector 10 in the same direction when the protector 10 is being deformed elastically and inserted in the fitting portion for the protector 11. In other words, it is preferable that the protector 10 in the fitting portion for the protector 11 is spaced away from the internal wall surfaces of the fitting portion for the protector 11 in the longitudinal direction of the fitting portion for the protector 11. If both ends of the protector 10 are in contact with the internal wall surfaces of the fitting portion for the protector 11 in the longitudinal direction of this fitting portion 11, the contact pressures that are to be generated between the protector 10 and the internal wall surfaces of the fitting portion 11 when the impact force Iz is exerted on the protector 10 will have a component in a direction other than the rotation direction Dy of the disk 16. As a result, the frictional force that can oppose the extracting force is not generated, so that it is likely that the protector 10 drops off.

When the protector 10 is formed of a material such as POM resin instead, a similar effect and result also can be obtained by setting a deformation amount to be caused by the insertion according to the material's elastic modulus and designing the dimension and shape of the fitting portion for the protector 11 according to this deformation amount.

In addition, since the direction of L that was defined in the fitting portion for the protector 11 (the longitudinal direction of the slot) is perpendicular to the rotation direction Dy of the disk, the protector 10 does not move in the direction W (the rotation direction Dy) with respect to the fitting portion for the protector 11 even when the disk 16 collides with the protector 10. Therefore, the collision does not cause the dislocation of the protector 10 or the like, making it possible to secure its positioning accuracy.

The planar shape of the fitting portion for the protector 11 of the present invention is not limited to the above example, but may be, for example, elliptic, oval, or the like. In any case, it is preferable that the fitting portion for the protector 11 has a shape that can compress the protector 10 in the rotation direction Dy of the disk and hold it therein.

In addition, the material of the protector 10 is not limited to silicone rubber or POM resin as long as it can be deformed elastically. For example, silicone resin other than silicone rubber, or other known elastic materials may be used.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An objective lens driving device comprising:
   an objective lens for recording on or reproducing from a disk;
   a lens holder for holding the objective lens;
   a damage prevention system for preventing the disk and the objective lens from being damaged by a collision of the objective lens or the lens holder with the disk;
   a base;
   a supporting member for supporting the lens holder elastically with respect to the base; and
   a driving system for moving the lens holder at least in a direction substantially parallel to an optical axis of the objective lens with respect to the base;
   wherein the damage prevention system comprises a substantially spherical protecting member formed of an elastic member and a fitting portion that is provided in the lens holder and in which the protecting member is inserted while being deformed; and
   wherein the fitting portion has a slot shape, a width smaller than a diameter of the protecting member and a depth greater than a radius of the protecting member.

2. The objective lens driving device according to claim 1, wherein the protecting member is formed of an elastic resin.

3. The objective lens driving device according to claim 1, wherein the protecting member is formed of a silicone resin.

4. The objective lens driving device according to claim 1, wherein the protecting member is formed of a POM resin.

5. The objective lens driving device according to claim 1, wherein the fitting portion has a slot shape and a longitudinal length greater than a length of the protecting member in a direction perpendicular to a compression direction, when the length of the protecting member is increased by compressing and deforming the protecting member to have a same width as the fitting portion.

6. The objective lens driving device according to claim 1, wherein the fitting portion has a slot shape, and the longitudinal direction thereof is substantially perpendicular to a rotation direction of the disk.

* * * * *